May 21, 1940.  P. NÈVE  2,201,738
PROCESS FOR EFFECTING REDUCING METALLURGICAL REACTIONS
Filed Dec. 23, 1937
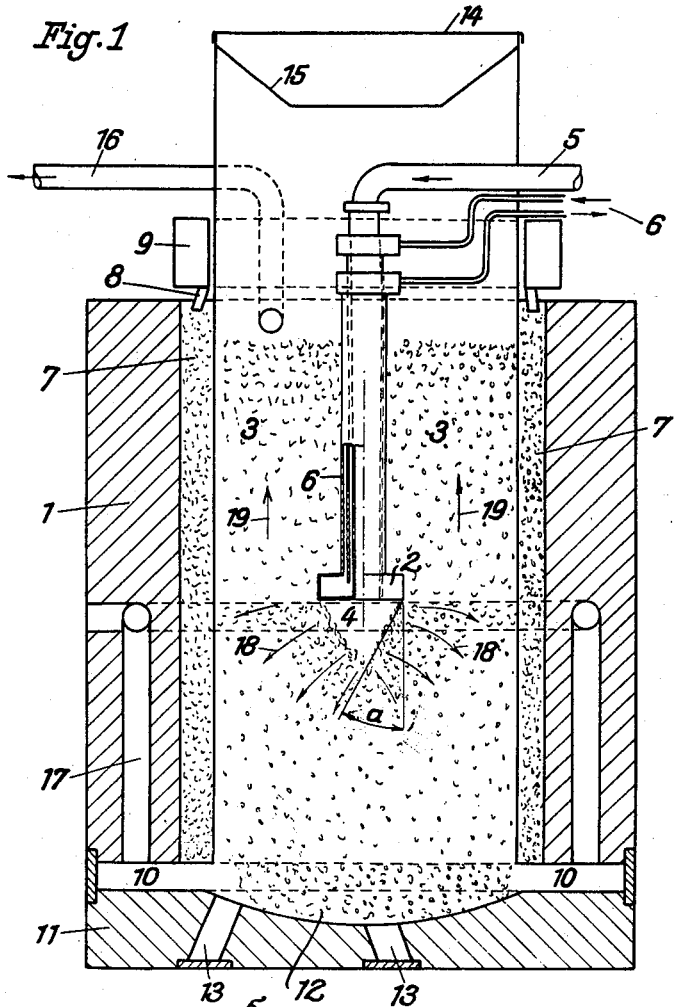
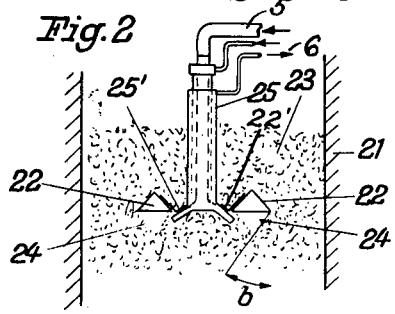
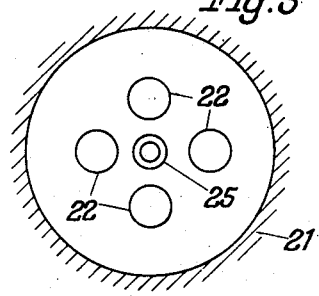
Inventor:
Pierre Nève Patented May 21, 1940

2,201,738

UNITED STATES PATENT OFFICE 2,201,738

PROCESS FOR EFFECTING REDUCING METALLURGICAL REACTIONS

Pierre Nève, Sclaigneaux, Belgium

Application December 23, 1937, Serial No. 181,441
In Germany September 13, 1937

3 Claims. (Cl. 266—25)

This invention relates to a process for effecting reductions and other reactions.

An object of this invention is to provide a process in which the material to be treated is progressively fed in a body together with combustible material downwardly past an obstruction located centrally of the body of material and which forms an inverted conical free space in said material, and introducing oxygen into the said opening for burning some of the combustible reducing material to heat the charge to a temperature at which further combustible material reduces the charge, the distribution of the oxygen over the cross-sectional area of the charge being uniform and the combustion originating at the central conical opening.

A further object of this invention is to shield the wall of the furnace from the charge proper by feeding a protecting layer of carbon therebetween.

Shaft furnaces and those of similar type are known to offer considerable practical advantages in respect of simplicity of construction, working and large output capacity, and also as regards highly efficient heat exchange.

In spite, however, of these manifest advantages, it has not, so far, been possible to adapt these furnaces more than incompletely, to meet the requirements of certain of the processes which are to be carried out therein. This defect is due to certain circumstances which are the inevitable result of the usual type of construction and method of working same. Above all, the walls of the furnace and the tuyères are too close together which, in many instances, necessitates the provision of water cooling of a very expensive character from the thermo-technical point of view. Moreover, the distribution of the gas current is irregular, and thus prevents uniform action of the gas throughout the whole of the reaction charge. Again, the height of the reaction zone is comparatively restricted, since the preheating zone and the cooling zone occupy a large portion of the total height of the furnace. There is also a risk of the treated materials flowing back, when volatile, to the upper end of the furnace.

It is the aim of the present invention to remedy these defects in the construction and working of the usual shaft furnaces, and to this end, in accordance with the invention, a combustion and reaction chamber is formed in the interior of the reaction charge in the furnace, by means of a baffle member so designed and arranged as to cause a portion of the descending reaction charge to assume its natural angle of repose, in descending, and thus leave below said baffle member, a free space for starting the combustion and reaction. The air needed for combustion, or the gases required for the reaction can be admitted by means of a pipe into the said space, through or below the baffle member. The pipe and the baffle member are constructed of heat-resisting material and if necessary, are provided with a cooling jacket supplied with water or other cooling liquid. The pipe and baffle member may also be made in one piece by forming the mouth of the pipe as baffle member.

The cubic capacity and superficial area of the combustion and reaction chamber formed in accordance with the present invention can be varied according to requirements by employing a baffle, or pipe forming the latter, of larger or smaller cross-sectional dimensions to suit the working conditions, so that the intensity of the reaction does not exceed or fall below the limits permissible in each case. It is of advantage to arrange the combustion and reaction chamber in the centre of the shaft furnace, for which purpose the baffle member or the pipe representing same, is mounted in the axis of the furnace. A plurality of combustion and reaction chambers, in accordance with the invention may be formed in the reaction mass which occupies the furnace by disposing baffle members or pipes formed as baffle members, at suitably selected different places in the furnace, in such a manner as to leave below each baffle member or pipe, a free space on the basis of the natural angle or repose of the descending reaction material. These places may be located near the axis of the furnace and either on the same level or different levels, in the furnace. To enable the level at which the combustion chamber or chambers are situated in the reaction material to be altered at convenience, the baffle member or members, or pipes serving this purpose, can be arranged so that they can be displaced vertically in the interior of the furnace.

The combustion and reaction chamber possesses primarily the advantage that it is independent of any structural material, except the reaction material and the baffle member and is continuously and automatically renewed and maintained by the descent of the reaction material in accordance with its natural angle of repose. Moreover, the wall of this combustion and reaction chamber is practically reduced to a minimum, namely to the baffle member or the pipe serving as the baffle and the pipe for admitting the combustion gases can be arranged at a considerable distance from the wall of the furnace. Furthermore, since the gas current takes its rise in the reaction material, in or near the center of the cross section of the furnace, a uniform and regular distribution of the combustion and reaction gases takes place through the reaction material and the height of the reduction and reaction zone is considerably increased.

The arrangement of the gas-supply pipe or pipes, in or near the center of the furnace also enables the combustion and reaction gases to flow radially from the combustion chamber and owing to the progressive diminution of the resistance opposing the flow of gas in the radial direction, this radial flow of the gases takes place theoretically, in a free space, the result being a uniform and complete utilisation of the thermal and reaction capacity of the interior of the furnace. This radial flow of the combustion and reaction gases in conjunction with the favourably distributed and predeterminable heating suface also enables very finely divided fuel to be employed in the furnace charge, a circumstance which implies a great advantage in respect of expense, the rate of reaction and the heat concentration. Moreover, an automatic separation of the ash constituents of the fuel and the liquefied substances from the combustion and reaction zone is effected by the natural angle of the fuel and by the diversion which the lateral flow of the combustion (and also, on occasion, the reaction) gases sets up in the (usually liquid) substances which tend to descend vertically so that the carbon is exposed and combines separately from the charge.

Another advantage afforded by the present invention consists in that the cubic capacity of the combustion and reaction chamber, formed by covering a suitably selected portion of the reaction material descending in the furnace enables, for the purpose of meeting certain technical requirements, pulverulent, or other, combustion or reaction materials to be introduced into said chamber through the gas-supply pipe without incurring the risk of quenching the furnace, in which the upper portion of the charge remains permanently active. Finally, a favourable effect of the creation of a combustion and reaction chamber according to the present invention also results from the circumstances that a portion of the current of gas formed in said chamber by the combustion of the carbon, is diverted upwards into the descending reaction material, so that it effects the preheating of the charge extending for a considerable height above the end of the gas-supply pipe, and thus renders said material suitable for the reaction. This partial gas current moving in the opposite direction to that of the descending reaction material, thus affords the possibility of subjecting the charge material to all the measures preceding the reduction, such as removing carbon dioxide and water of hydration, roasting and so forth, and supplying it with a maximum amount of heat energy.

In order more clearly to understand operation of the process according to the invention reference is made to the accompanying drawing, which illustrates diagrammatically and by way of example, several embodiments thereof and in which:

Fig. 1 represents a cross section of a shaft furnace with a single combustion and reaction chamber; and Figs. 2 and 3 show in longitudinal and cross section respectively, a shaft furnace provided with a plurality of combustion and reaction chambers.

Referring to Fig. 1, there is located in the interior of the shaft furnace 1, a baffle member 2 formed for example, by a round or polygonal horizontal disc, and inducing a portion of the charge material 3 descending in the furnace to adjust itself at its natural angle of repose $a$ and move accordingly, so that a free space 4 is formed below the member 2. Said free space 4 is supplied with air, or pure oxygen, through the pipe 5 and thus forms the combustion and reaction chamber. The baffle member 2 and pipe 5 can be combined as a single unit, the member 2 forming the mouth of the pipe. The pipe 5 and baffle 2 are preferably located in the axis of the furnace 1, and if needed, the pipe 5 can be telescopically mounted, and the level of the baffle 2 combined with the pipe 5—and therefore the level of the combustion and reaction formed thereby—in the furnace 1, can be varied in accordance with working requirements. This displacement can be made possible for example, by guiding the pipe 5 which is threaded in a nut arranged on the wall of the furnace 1. The baffle member 2 and pipe 5 are made of heat-resisting material and are provided with a cooling jacket 6 traversed by water. The wall of the furnace 1 is also constructed of heat-resisting materials and may be provided with a lining 7 consisting for example, of a mixture of tar and carbon, which can be continuously replenished from an annular hopper 9, by way of the annular nozzle 8. The lower end portion of said lining 7 can be removed from the furnace by means of scrapers, through the channels 10 which are normally closed.

The bottom of the furnace 1 consists of a detachable box 11, which is lined with carbon and is provided with a trough 12 to receive the liquid substances, and also with holes 13 for the removal of solids. At the upper end of the furnace 1 is the furnace top 14 which also contains the charging hopper 15. Extending from the top 14 is the pipe 16 which can be connected with an exhausting device, whilst the channel 17 branches off from the lower part of the furnace 1. The air, or pure oxygen, can be admitted under pressure by means of a compressor, into the combustion and reaction chamber 4, through the inlet pipe 5, and the current of gas formed by the combustion distributes itself radially and therefore uniformly, through the material under treatment, as indicated by the arrows 16. In addition, a portion of said gas current passes upwards in the direction of the arrows 19, and preheats the upper portion of the charge 3. The ascending reaction gases are led away through the pipe 16 and the descending reaction gases escape through the channel 17. If the baffle member 2 be replaced by one of larger or smaller cross section, the volume and superficial area of the combustion and reaction chamber can be varied at convenience, in accordance with working requirements.

According to Figs. 2 and 3, several—for example four—baffle members 22, supported by arms 22' from supply pipe 25, are uniformly distributed around and in the vicinity of the axis of the shaft furnace 21. Each of said members 22 produces at its bottom surface, a free space 24, by causing a portion of the descending charge material 23 to adjust itself during its descent in accordance with its nautral angle of repose b. These four free spaces 24 are supplied with air, or pure oxygen, through the supply pipe 25 which communicates through four branches 25', with the several spaces 24, which thus form four combustion and reaction chambers in the interior of the charge material 23. The supply pipe 25, 25' and the baffles 22 are surrounded by a cooling jacket as in the case of the corresponding parts of the shaft furnace according to Fig. 1, with which the other details of construction and operation of the furnace shown in Figs. 2 and 3 are also similar.

The reaction furnace of the present invention can be employed for numerous purposes, such as the treatment of ores, the reduction of sulphates to sulphides or of phosphates to phosphorous, for the production of metals, and the carrying out of other metallurgical reactions by the combustion of carbon.

Having now particularly described and ascertained the nature of my said invention and in what manner the same is to be performed, I declare that what I claim is:

1. Process for carrying out reducing metallurgical reactions by the combustion of carbon in a shaft furnace, comprising moving a charge containing carbon in infusible form downwardly through the furnace, forming at about the center of the furnace a cavity in the charge in the form of an inverted cone, by flowing the charge around an obstacle in its path at that point and causing a portion of the charge to flow along the angle of the repose of the cavity, passing gaseous oxygen into said cavity, and distributing said oxygen gas by means of the conical wall of the cavity uniformly in the charge, thus producing combustion, reduction and melting phenomena at the middle portion of the charge by heat produced by burning part of the carbon mixed in the charge with the oxygen supplied to said charge, through said cavity, and reduction of the charge by another part of the carbon in the charge.

2. Process according to claim 1, and supplying a jacket layer of carbon around said charge within the furnace wall, and replenishing said layer as required by downward movement thereof with the charge, whereby direct contact of the charge with the furnace wall is prevented.

3. A process for effecting metallurgical reactions in a shaft furnace having at approximately its middle region a baffle member to cause a portion of the charge to slant at its natural angle of repose and to thereby form a substantially conical hollow in the charge, comprising feeding combustible together with the charge into the furnace and introducing into the substantially conical hollow a gas consisting essentially of oxygen and forcing the same into and through the conical wall of said hollow so as to produce a uniform distribution of the oxygen from the middle of the furnace space and to originate the combustion and reaction from the conical wall of said hollow.

PIERRE NÈVE.